United States Patent [19]
Newman

[11] Patent Number: 5,681,901
[45] Date of Patent: Oct. 28, 1997

[54] PROCESS FOR HALOGENATING ISOMONOOLEFIN COPOLYMERS

[75] Inventor: Neil Frederick Newman, Kingwood, Tex.

[73] Assignee: Exxon Chemical Patents Inc., Houston, Tex.

[21] Appl. No.: 685,403

[22] Filed: Jul. 24, 1996

[51] Int. Cl.$^6$ .................................................. C08F 8/22
[52] U.S. Cl. ........................ 525/356; 525/333.4; 525/355
[58] Field of Search ................................. 525/355, 356

[56] References Cited

U.S. PATENT DOCUMENTS

| | | | |
|---|---|---|---|
| 3,018,275 | 12/1962 | Cottle | 260/85.3 |
| 5,077,345 | 12/1991 | Newman et al. | 525/355 |
| 5,162,445 | 11/1992 | Powers et al. | 525/333.4 |
| 5,306,740 | 4/1994 | Laas et al. | 525/356 |
| 5,569,723 | 10/1996 | Baade et al. | 525/356 |

FOREIGN PATENT DOCUMENTS

| | | |
|---|---|---|
| 709401 | 5/1996 | European Pat. Off. |
| 867737 | 5/1961 | United Kingdom |

Primary Examiner—Bernard Lipman
Attorney, Agent, or Firm—Myron B. Kurtzman

[57] ABSTRACT

A process for halogenating a copolymer of a $C_4$ to $C_7$ isomonoolefin, e.g. isobutylene, and a multiolefin, e.g. isoprene or a para-alkylstyrene, e.g., para-methylstyrene, is disclosed. Increased halogenation efficiency and decreased reaction time is achieved by conducting the reaction in the presence of a halogen source and an aqueous emulsion containing a water soluble oxidizing agent, e.g. hydrogen peroxide, which oxidizes hydrogen halide generated in-situ in the reaction back to free halogen.

14 Claims, No Drawings

PROCESS FOR HALOGENATING ISOMONOOLEFIN COPOLYMERS

BACKGROUND OF THE INVENTION

1. Field of the Invention

The present invention relates to an improved method for halogenating copolymers of a $C_4$ to $C_7$ isomonoolefin and a $C_4$ to $C_4$ multiolefin or a para-alkystyrene.

2. Description of the Related Art

Halogenated copolymers of a $C_4$ to $C_7$ isomonoolefin, e.g., isobutylene with from about 0.5 to 10 wt % of a $C_4$ to $C_{14}$ multiolefin, e.g., isoprene, 1,3 butadiene, 2, 3-dimethyl-1, 3-butadiene or piperylene are well known in the art, and possess outstanding properties such as oil and ozone resistance and improved impermeability to air. Commercial halo-butyl rubber is a halogenated copolymer of isobutylene and up to about 5 wt % of isoprene. Halogenated butyl rubber may be prepared using relatively facile ionic reactions by contacting the polymer, preferably dissolved in organic solvent, with a halogen source, e.g., molecular bromine or chlorine, and heating the mixture to a temperature ranging from about 20° C. to 90° C. for a period of time sufficient for the addition of free halogen in the reaction mixture onto the polymer backbone. Such processes are generally disclosed in U.S. Pat. No. 2,732,354.

More recently, a new class of halogenated copolymers have been discovered which offer many of the same properties as halogenated butyl rubber, but are even more ozone and solvent resistant. These materials are the halogenation product of random copolymers of from abut 10 to 99.5 wt % of a $C_4$ to $C_7$ isomonoolefin, such as isobutylene, and from about 0.5 to 90 wt % of a para-alkylstyrene comonomer such that at least some of the alkyl substituent groups present in the styrene monomer units contain halogen.

More preferred materials are elastomeric copolymers of isobutylene and para-methylstyrene containing from about 0.5 to about 20 wt % para-methylstyrene wherein up to about 65% of the methyl substituent groups present on the benzene ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 5, more preferably less than about 2.5, viscosity average molecular weights in the range of from about 300,000 up to about 2,000,000, and a glass transition temperature (Tg) of below about 50° C. These copolymers and halogenated versions thereof prepared by free radical halogenation methods are disclosed in U.S. Pat. No. 5,162,445, the complete disclosure of which is incorporated herein by reference.

A major inefficiency in ionic halogenation processes used to halogenated butyl rubber and in free radical halogenation processes used to halogenated isobutylene/para-alkylstyrene copolymers is that the theoretical fraction of halogen present in the reaction mixture which can be placed on the polymer is only 50%, and the actual utilization is usually less than 45%. Most of the remaining halogen fraction will combine with hydrogen extracted from the polymer to form a hydrogen halide by-product which, under normal conditions, does not halogenate the polymer. This by-product is subsequently neutralized with an alkaline material and washed from the polymer reaction product, as described for example in U.S. Pat. No. 5,077,345.

One known method to enhance the efficiency of butyl rubber halogenation involves inclusion in the reaction media of at least 0.5 mole per mole of halogenating agent of an oxidizing agent such as hydrogen peroxide which oxidizes One known method to enhance the efficiency of butyl rubber halogenation involves inclusion in the reaction media of at least 0.5 mole per mole of halogenating agent of an oxidizing agent such as hydrogen peroxide which oxidizes the hydrogen halide by-product as it forms back to ionic halogen. This regenerated halogen is thus available to further halogenate the butyl rubber, thereby increasing the halogenation utilization by as much as 70%. Such a process is disclosed in U.S. Pat. No. 3,018,275 and in UK Patent 867,737.

Another process for improving the bromination efficiency in rubber bromination processes is to conduct the reaction in the presence of elemental bromine and an aqueous solution of an organic azo compound such as azodiisobutronitrile and/or an alkali or alkaline earth metal hypochlorite, as disclosed in EP0709401 A1.

Copending application (08/686,194), filed in the United States on Jul. 24, 1996, also discloses and claims a process for the halogenation of a copolymer of a $C_4$ to $C_7$ isomonoolefin and a para-alkylstyrene. Increased halogenation efficiency is achieved by conducting the reaction under free radical halogenation conditions and in the presence of an oxidizing agent, e.g., hydrogen peroxide, which oxidizes hydrogen halide generated in-situ in the reaction back to free halogen. The oxidizing agent is preferably not added to the reaction medium until after first stage halogenation is substantially complete.

Such halogenation processes have rate limiting steps involving diffusion of halogen and hydrogen halide between the organic phase of the reaction mixture containing both the dissolved co-polymer and halogen, and the aqueous phase containing the oxidizing agent and in-situ generated hydrogen halide. This rate limiting reaction factor can lead to reduced halogen utilization or may necessitate a commercially unacceptable increase in reactor residence time in order to achieve the desired degree of halogenation of the copolymer substrate.

SUMMARY OF THE INVENTION

This invention provides a process for halogenating a copolymer selected from the group consisting of a copolymer of a $C_4$ to $C_7$ isomonoolefin and a $C_4$ to $C_{14}$ multiolefin and a copolymer of a $C_4$ to $C_7$ isomonoolefin and a para-alkystyrene comprising:

(a) contacting a solution of said copolymer in organic solvent under halogenation conditions with a halogenating agent and an emulsion, said emulsion comprising a mixture of:
   (i) a water soluble oxidizing agent capable of converting hydrogen halide to free halogen;
   (ii) an emulsifying agent;
   (iii) an organic solvent; and
   (iv) water; and (b) recovering said halogenated copolymer containing at least about 0.05 mole % of chemically combined halogen.

DETAILED DESCRIPTION OF THE INVENTION

Preferred copolymers which may be halogenated in accordance with this invention include copolymers of isobutylene with up to about 10 wt % isoprene (butyl rubber) and copolymers of isobutylene with up to about 20 wt % para-methylstyrene (I-PAS rubber). Since butyl rubber contains unsaturation in the polymer backbone, it may be readily halogenated using an ionic mechanism by contact of a solution of the polymer with a halogen source, e.g. molecular bromine or chlorine, and at temperatures in the range of from about 20° C. to 90° C. On the other hand, I-PAS rubber contains no unsaturation in the polymer backbone and halogenation is normally carried out under free radical halogenation conditions, i.e, in the presence of white actinic light or by inclusion of an organic free radical initiator in the reaction mixture, and at temperatures of 20° C. to 90° C.

The present invention is based on the discovery that the utilization of halogen in butyl rubber ionic halogenation processes and in I-PAS rubber free radical halogenation processes can be substantially increased and reactor residence time decreased by carrying out the halogenation reaction in the presence of an emulsion comprising an oil-dispersed aqueous phase which contains a dissolved oxidizing agent. The emulsion may be added to the halogenation reaction mixture either at the onset of the halogenation reaction or, more preferably, where I-PAS is the copolymer substrate, at a second stage after the polymer has been partially halogenated in a first stage. It has been found that the halogenation reaction proceeds more quickly and greater halogen utilization is achieved where the oxidizing agent is present in emulsion form vs. the form of a purely aqueous solution, such as described in UK patent 867,737 or U.S. Pat. No. 3,018,275.

Where I-PAS rubber comprises the halogenation substrate and the reaction mixture contains an organic free radical initiator, the emulsion is preferably added in a second reaction stage only after a substantial portion of the halogen source has been consumed in a first reaction stage. This sequential addition has been found to minimize unwanted reactions between the organic free radical initiator and the oxidizing agent and to maximize halogen utilization in such a process.

Halogenating agents which may be used as a source of halogen in accordance with the invention include molecular bromine ($Br_2$) or chlorine, bromine chloride, iodine bromide and mixtures thereof. Where the reaction is conducted with the oxidizing agent present at the onset of the halogenation reaction, hydrogen bromide or hydrogen chloride may be used as the halogen source. The preferred halogen source is molecular bromine.

Since a considerable portion of the hydrogen halide, e.g. hydrogen bromide, generated in-situ as a halogenation process by-product is oxidized to regenerate useful halogen, smaller amounts of halogenating agent are initially required to achieve a given degree of polymer halogenation than would be the case where the reaction is conducted without the use of oxidizing agent. As a general rule, the amount of halogenating agent present in the reaction media may vary between about 0.5 to 25 parts by weight per 100 parts by weight polymer (php) more preferably from about 1–10 php and most preferably from about 1.5 to 6 php.

Free radical initiators which may be used in accordance with the invention in I-PAS halogenation include any source of light, e.g., actinic white light or, where the reaction is conducted in the absence of light, one or more organic free radical initiators. Preferred initiators are those which have a half life of between about 0.5 and 2500 minutes under the desired reaction conditions, and more preferably a half life of about 10 to 300 minutes. The amount of chemical initiator employed may vary between about 0.005 to about one part by weight php, preferably between about 0.01 and 0.4 parts by weight php. The most preferred chemical initiators are azobis compounds including azobisisobutyronitrile, azobis (2-methyl butyro) nitrile, 2,2'-azobis (2,4,4 trimethyl pentanenitrile) and azobis (2, 4-dimethyl valero) nitrile. Other free radical initiators could also be used provided they are relatively poor at hydrogen abstraction so that they react preferentially with the molecular halogen molecules to form halogen atoms rather than with the I-PAS copolymer or any solvent present in the reaction mixture to form alkyl radicals or crosslinked structures.

The oxidizing agents which have been found suitable for the purposes of the present invention are water soluble materials which contain oxygen. Preferred agents are peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perunanic, perboric, perphosphoric, perpyrophosphoric, persulfates, perchloric, perchlorate and periodic acids. Of the foregoing, hydrogen peroxide and hydrogen peroxide-forming compounds, e.g. per-acids and sodium peroxide, have been found to be highly suitable for carrying out the present reaction.

The amount of oxidizing agent used in accordance with the invention depends on the amount and kind of halogenating agent used. Generally from about 0.5 to about 3 mole of oxidizing agent per mole of halogenating agent may be used. The preferred amount of oxidizing agent present in the reaction mixture ranges from about 1 to 2 moles per mole of halogenating agent.

The oxidizing agent is introduced into the halogenation reaction zone as an emulsion comprising an aqueous solution of the oxidizing agent finely dispersed in solvent with the assistance of an emulsifying agent (water-in-oil emulsion). The emulsion may be conveniently prepared by first providing a 10 to 80 wt %, more preferably 20 to 70 wt % solution of the oxidizing agent in water and mixing this with an organic solvent and a suitable emulsifying agent under high shear mixing conditions or by vigorous shaking until the aqueous phase is finely dispersed in the solvent phase to form a stable emulsion. The aqueous phase will generally constitute less than 50wt % of the emulsion, more preferably from about 5 to 35 wt % of the emulsion.

Solvents which may be used to form the emulsion may comprise the same solvents in which the polymer substrate is dissolved, e.g., hexane, pentane, benzene and the like. The emulsifying agent may comprise any of the well known anionic, cationic or non-ionic surfactants, although non-ionic surfactants are preferred. Suitable surfactants include long chain sulfonates or sulfates, fatty alcohols and ethoxylated fatty alcohols and like materials. Preferred surfactants are alkylphenol ethoxylates or alkylphenoxypoly (oxyethylene) ethanols marketed by G.A.F. under the IGEPAL® tradename. Generally, a surfactant content in the emulsion of from about 0.1 to 1.0 wt % is sufficient to form suitable emulsions.

The quantity of oxidizing emulsion contacted with the polymer substrate should be sufficient to provide about 0.5 to 3 mole, more preferably about 1 to 2 moles of active oxidizing agent per mole of halogenating agent, as described above.

The halogenation reaction may be carried out by first dissolving the copolymer in a suitable organic solvent such as a $C_4$ to $C_{10}$ aliphatic, cycloaliphatic or aromatic liquid.

Suitable solvents include normal hexane, cyclohexane, normal pentane, normal heptane and benzene. Halogen-containing solvents such as chlorobenzene, carbon tetrachloride and chloroform may also be used. The polymer solution, which may contain from as little as 1 wt % polymer or as much as 40 wt % polymer, is introduced into a reaction zone which is provided with suitable means to permit intimate contact of the reactants. The temperature of the polymer solution is adjusted to that which is most convenient for carrying out the reaction in view of the various properties of the reactants and the volatility of the solvent. To insure a fairly rapid reaction it is advisable to employ a reaction temperature above 0° C., e.g. at least 5° C., and it is preferred to maintain the temperature between about 20° and 80° C. However, under certain conditions, especially where less reactive materials are employed, it may be desirable to run the reaction at temperatures ranging up to 150° C. or higher.

Where the oxidizing agent is introduced into the reaction zone at the onset of the halogenation reaction, it may be added prior to, concurrently with or subsequent to the addition of the halogenating agent and chemical free radical initiator, where present. More preferably, however, and where I-PAS is the copolymer substrate, the oxidizing agent is not added to the reaction mixture until after at least about 50wt %, more preferably about 75–100 wt % of the halogenating agent has been consumed in the halogenation reaction. Halogen consumption is indicated, where molecular bromine is used as the halogenating agent, by a change in color of the reaction mixture from reddish brown to a light tan or amber color. Halogen consumption can also be calculated stoichiometrically as a function of reaction speed under reaction conditions.

After completion of the halogenation reaction, the polymer may be recovered by conventional methods, e.g., neutralization with dilute caustic, water washing and removal of solvent such as by steam stripping or precipitation using a lower alcohol such as isopropanol, followed by drying. Processing aids and antioxidants may be mixed with the halogenated polymer product prior to or subsequent to stripping the solvent.

The halogenation reaction is normally conducted for a period of time of from about 1 minute up to about 3 or 4 hours, depending upon reaction conditions, until a halogenated polymer containing at least about 0.05 mole % of chemically combined halogen is achieved. More preferably, the halogenation is conducted for about 3 to 90 minutes until a polymer containing from about 0.1 to about 5 mole % of chemically combined halogen is achieved.

The following examples are illustrative of the invention.

EXAMPLE 1

A 15 wt % aqueous hydrogen peroxide emulsion was prepared as follows: 2.0 grams of hydrogen peroxide solution (30 wt % in water) was combined with 11.33 grams of hexane and 60 mg of IGEPAL® CO-66 (ethoxylated nonyl phenol) emulsifier in a small bottle and the bottle was then shaken vigorously by hand until a stable emulsion was observed.

EXAMPLE 2

In a 500 ml foil covered flask, 22.4 grams of a copolymer of isobutylene containing 1.8 wt% of isoprene having a Mooney Viscosity of 40 (1+8 at 125° C.) was dissolved in hexane to form a cement containing 16.8 wt % rubber. Next, a 3.0 gram portion of the emulsion prepared in Example 1 (0.135gm, 3.9 m.moles of $H_2O_2$) was added to the flask under vigorous stirring. Bromine (0.60 grams - 3.8 m.moles) was weighed into 10 ml of cyclohexane. The lab was darkened and the bromine solution was added rapidly to the cement, while stirring the mixture. Stirring was continued for 3 minutes and the mixture was then allowed to stand, unstirred, for an additional 57 minutes. The reaction was conducted at about 25° C.

The reaction product was then neutralized by adding 90 ml of 0.2M NaoH to the mixture and stirring an additional 5 minutes. Lab lights were turned on and the foil cover was removed from the flask. The aqueous phase was settled and drained, and the cement was washed four times with 100 ml portions of water to remove any residual inorganic bromides. 3 ml of a 10% aqueous suspension of calcium stearate, 0.3 grams of epoxidized soybean oil and 10 mg. of butylated hydroxytoluene (stripping aid, stabilizer and antioxidant) were then added to the cement, the cement was steam stripped and the resulting polymer was dried on a hot mill. Bromine content was measured by XRF.

EXAMPLE 3

Example 2 was repeated as set forth above, except that the cement was stirred for 60 minutes after the addition of the bromine vs the 3 minute stir and 57 minute standing period of Example 2.

Control Examples 4 and 5

Examples 2 and 3 were repeated except that the same quantity of hydrogen peroxide was added to the reaction mixture as a 30 wt % aqueous solution instead of in emulsion form.

Bromine utilization, i.e., the amount of polymer-bound bromine, was determined for each example and the results are shown in Table 1.

TABLE 1

| | | $Br_2$ Utilization (%) | |
|---|---|---|---|
| Stirred (MIN) | Stand (MIN) | STD $H_2O_o$ | EMULS $H_2O_2$ |
| 3 | 57 | 73 (Ex 4) | 84 (Ex 2) |
| 60 | 0 | 75 (Ex 5) | 84 (Ex 3) |

The results in Table 1 demonstrate an approximately 14% increase in bromine utilization in the process where the peroxide is used in emulsion vs. solution form.

What is claimed is:

1. A process for halogenating a copolymer selected from the group consisting of a copolymer of a $C_4$ to $C_7$ isomonoolefin and a $C_4$ to $C_{14}$ multiolefin and a copolymer of a $C_4$ to $C_7$ isomonoolefin and a para-alkystyrene comprising:
   (a) contacting a solution of said copolymer in organic solvent under halogenation conditions with a halogenating agent and an emulsion, said emulsion comprising a mixture of:
      (i) a water soluble oxidizing agent capable of converting hydrogen halide to free halogen;
      (ii) an emulsifying agent;
      (iii) an organic solvent; and
      (iv) water; and
   (b) recovering said halogenated copolymer containing at least about 0.05 mole % of chemically combined halogen.

2. The process of claim 1 wherein said oxidizing agent is hydrogen peroxide.

3. The process of claim 1 wherein the molar ratio of said oxidizing agent to halogenating agent is from about 0.5 to about 3.

4. The process of claim 3 wherein said molar ratio is at least about 1.

5. The process of claim 1 wherein said halogenated copolymer contains at least about 0.1 mole % of chemically combined halogen.

6. The process of claim 1 wherein said copolymer is an elastomeric copolymer of sobutylene containing up to 5 wt % isoprene.

7. The process of claim 6 wherein said halogenating agent is molecular chlorine or bromine.

8. The process of claim 1 wherein said copolymer is an elastomeric copolymer of isobutylene containing up to 20 wt % of para-methylstyrene.

9. The process of claim 1 wherein said emulsion is a water-in-oil emulsion.

10. The process of claim 6 wherein said halogenation is conducted under ionic halogenation conditions using molecular bromine as the halogenating agent.

11. The process of claim 8 wherein said halogenation is conducted under free radical halogenation conditions using molecular bromine as the halogenating agent.

12. The process of claim 11 wherein said halogenation is conducted in the presence of an organic free radical initiator.

13. The process of claim 12 wherein said molecular bromine and said organic free radical initiator are first contacted with said copolymer to produce a reaction product mixture containing a partially brominated copolymer and in-situ generated hydrogen bromide, and said reaction product mixture is then contacted with said emulsion under halogenation conditions until a brominated copolymer containing at least about 0.1 mole % of bromine is obtained.

14. The process of claim 13 wherein said organic free radical initiator is a bis azo compound selected from the group consisting of azobisisobutyronitrile, azobis (2-methylbutyro) nitrile, 2,2'-azobis(trimethyl pentane nitrile), and azobis (2, 4-dimethylvalero) nitrile.

* * * * *